(12) United States Patent
Favaretto et al.

(10) Patent No.: US 11,158,894 B2
(45) Date of Patent: Oct. 26, 2021

(54) BATTERY MODULE FOR AN ELECTRICAL STORAGE SYSTEM FOR AN ELECTRIC DRIVE VEHICLE

(71) Applicant: FERRARI S.p.A., Modena (IT)

(72) Inventors: Fabrizio Favaretto, Formigine (IT); Andrea Pezzati, Scandicci (IT)

(73) Assignee: FERRARI S.p.A., Modena (IT)

( * ) Notice: Subject to any disclaimer, the term of this patent is extended or adjusted under 35 U.S.C. 154(b) by 303 days.

(21) Appl. No.: 16/366,129

(22) Filed: Mar. 27, 2019

(65) Prior Publication Data

US 2019/0305395 A1 Oct. 3, 2019

(30) Foreign Application Priority Data

Mar. 28, 2018 (IT) .................. 102018000004025

(51) Int. Cl.
*H01M 10/6554* (2014.01)
*H01M 10/625* (2014.01)
(Continued)

(52) U.S. Cl.
CPC ........... *H01M 10/6554* (2015.04); *B60K 1/04* (2013.01); *H01M 10/613* (2015.04); *H01M 10/625* (2015.04); *H01M 10/643* (2015.04); *H01M 10/653* (2015.04); *H01M 10/6556* (2015.04); *H01M 10/6568* (2015.04);
(Continued)

(58) Field of Classification Search
CPC ............. B60K 1/04; B60K 2001/0405; H01M 10/613; H01M 10/625; H01M 10/643; H01M 10/653; H01M 10/6554; H01M 10/6556; H01M 10/6568; H01M 2220/20; H01M 50/20; H01M 50/213;
(Continued)

(56) References Cited

U.S. PATENT DOCUMENTS

| 2012/0315529 A1* | 12/2012 | Jin | .................... H01M 10/6556 429/120 |
| 2015/0086829 A1* | 3/2015 | Sun | .................... H01M 10/625 429/120 |

(Continued)

FOREIGN PATENT DOCUMENTS

| CN | 104600398 A | 5/2015 |
| EP | 3264497 A1 | 3/2018 |

(Continued)

OTHER PUBLICATIONS

International Search Report issued in International Application No. IT201800004025, completed Nov. 28, 2018; 9 pages.

*Primary Examiner* — Lingwen R Zeng
(74) *Attorney, Agent, or Firm* — Cantor Colburn LLP

(57) ABSTRACT

Battery module for an electrical storage system for an electric drive vehicle; wherein the battery module includes: a set of parallel cylindrical chemical batteries arranged side by side, at least two conductive plates arranged on said opposite sides and welded to the corresponding opposite terminals of said set of batteries, at least one refrigerated wall set adherent to one of said at least two conductive plates, at least one pad sandwiched between said at least one refrigerated wall and said at least one respective conductive plate, in which said pad is made of an electrically insulating and thermally conductive material.

19 Claims, 18 Drawing Sheets

(51) Int. Cl.
  *H01M 10/643*   (2014.01)
  *H01M 10/6568*  (2014.01)
  *H01M 10/613*   (2014.01)
  *H01M 10/653*   (2014.01)
  *H01M 10/6556*  (2014.01)
  *H01M 2/10*     (2006.01)
  *B60K 1/04*     (2019.01)
  *H01M 50/20*    (2021.01)

(52) U.S. Cl.
  CPC ..... *H01M 50/20* (2021.01); *B60K 2001/0405* (2013.01); *H01M 2220/20* (2013.01)

(58) Field of Classification Search
  CPC ............. H01M 50/242; H01M 50/249; H01M 50/264; Y02E 60/10
  See application file for complete search history.

(56) References Cited

U.S. PATENT DOCUMENTS

| | | | |
|---|---|---|---|
| 2017/0025655 A1* | 1/2017 | Klimek | H01M 10/613 |
| 2018/0006282 A1* | 1/2018 | Favaretto | H01M 10/425 |
| 2018/0261992 A1* | 9/2018 | Bower | H01B 3/306 |

FOREIGN PATENT DOCUMENTS

| | | |
|---|---|---|
| EP | 3293792 A1 | 3/2018 |
| JP | 2012221801 A | 11/2012 |

* cited by examiner

BATTERY MODULE FOR AN ELECTRICAL STORAGE SYSTEM FOR AN ELECTRIC DRIVE VEHICLE

CROSS-REFERENCE TO RELATED APPLICATIONS

This patent application claims priority from Italian patent application no. 102018000004025 filed on Mar. 28, 2018, the entire disclosure of which is incorporated herein by reference.

TECHNICAL FIELD

The present invention relates to a battery module for an electrical storage system for an electric drive vehicle.

The present invention finds advantageous application in a hybrid drive vehicle to which the following description will explicitly refer without thereby losing generality.

PRIOR ART

A hybrid vehicle comprises an internal combustion heat engine, which transmits the driving torque to the driving wheels by means of a transmission equipped with a gearbox, and at least one electric machine that is mechanically connected to the driving wheels and is electrically connected to an electrical storage system. Normally, the electrical storage system includes a set of chemical batteries that are connected in parallel and in series.

The patent application EP2626923A1 discloses an electrical storage system for an electric drive vehicle. This storage system is provided with a set of chemical batteries connected in parallel and in series, each of which has a substantially elongated cylindrical shape with a central symmetry axis and is provided with a respective electrochemical cell. The chemical batteries are arranged inside a supporting matrix made of plastic material, which provides a mechanical support to the chemical batteries.

However, passive cooling of battery matrices is difficult, as the available space is often very limited.

What is described in the part relating to the prior art only provides a better understanding of the invention and does not represent a declaration of existence of what has been described.

DESCRIPTION OF THE INVENTION

The object of the present invention is to provide a battery module for an electrical storage system for an electric drive vehicle, said battery module being free from the aforementioned drawbacks and, at the same time, being easy and inexpensive to manufacture.

The basic idea of the present invention is to provide the cooling of a set of batteries through the terminals of the same batteries.

For this purpose, the set of batteries comprises a plurality of cylindrical batteries having respective parallel rotation axes and preferably forming offset rows in order to obtain an optimal packing.

The set of batteries is hold in position by a plastic material structure, preferably made in two shells, which forms a module. Each shell comprises seats to receive the ends of the cylindrical batteries, thus forming a sandwich in a direction parallel to said rotation axes.

This structure is made so as to receive, on each of the opposite sides facing the terminals of the cylindrical batteries, at least one conductive plate i.e. made of electrical and thermal conductive material, e.g. metallic materials such as copper, aluminium, nickel-plated steel.

This conductive plate physically and simultaneously contacts the terminals of two or more batteries of the set, thus forming the necessary connections in series or in parallel and providing the cooling of the same batteries.

The conductive plate is sized so as to occupy the maximum possible space with respect to a base defined by a relative set of batteries. Advantageously, this maximizes a heat exchange surface. This also allows limiting the thickness of the same conductive plate, which in this way can be less than 7 tenths of a millimetre.

In other words, the conductive plate is flat and stretched for as much surface as possible to have the maximum interface surface with the refrigerated part and, at the same time, a low amperes/$mm^2$ ratio.

With regard to the series or parallel connection formed by a same conductive plate, the relative batteries can be oriented in the same or in the opposite direction, so that terminals of the same potential or of opposite potential can be collected onto the same conductive plate.

According to the present invention, cooling is achieved through the aforesaid conductive plates. A liquid-cooled wall is associated at least with at least one conductive plate, in thermal contact with it.

If a module comprises several conductive plates arranged side by side on a common plane, a single refrigerated wall can be used to contact and cool all such conductive plates. Arranged "side by side" does not mean that they are in mutual contact. Indeed, it is probable that two plates arranged side by side are at a different potential and therefore it is appropriate that they are not short-circuited with each other.

Between the liquid-cooled wall and the at least one conductive plate it is interposed a pad of resilient material, suitable for transferring heat and at the same time electrically isolating the at least one conductive plate from the liquid-cooled wall.

The liquid-cooled or simply refrigerated wall is generally made of metal and preferably aluminium.

Preferably, the conductive plate is a flat and substantially continuous surface of metallic material, which is welded to the circular terminals of the chemical batteries by laser-welding.

It is preferred that the welding be extended as much as possible to reduce the relative resistance, both from an electrical and from a thermal point of view. This means that it is made along a circular profile on the periphery of the chemical battery terminals.

The opposite terminals of a set of chemical batteries identify envelope surfaces and related "opposite sides" of the battery module including said set of batteries.

Preferably, cooling is provided on both opposite sides of the battery module.

According to a preferred variant of the invention that is combined with any of the previous ones, it is provided a U-shaped liquid circulation between the two opposite refrigerated walls. Advantageously, this guarantees a fair exchange of all the batteries, regardless of their orientation. For the geometric differences of the cell, the positive terminal offers a different thermal resistance from the corresponding negative terminal.

According to a further preferred variant of the invention that is combined with any of the previous ones, the connection of the battery module to a surface of a vehicle floor panel is made by means of screws that take hold on the refrigerated wall opposite the one contacting said surface, so that fastening the module to said surface causes a compression in said direction parallel to said rotation axes. Advantageously, this compression guarantees an optimal heat exchange condition through the aforementioned pad.

The claims describe preferred variants of the invention, forming an integral part of the present description.

BRIEF DESCRIPTION OF THE DRAWINGS

The present invention will now be described with reference to the annexed drawings showing some non-limiting embodiments thereof, in which.

The same numbers and the same reference letters in the figures identify the same elements or components.

Figure 1:
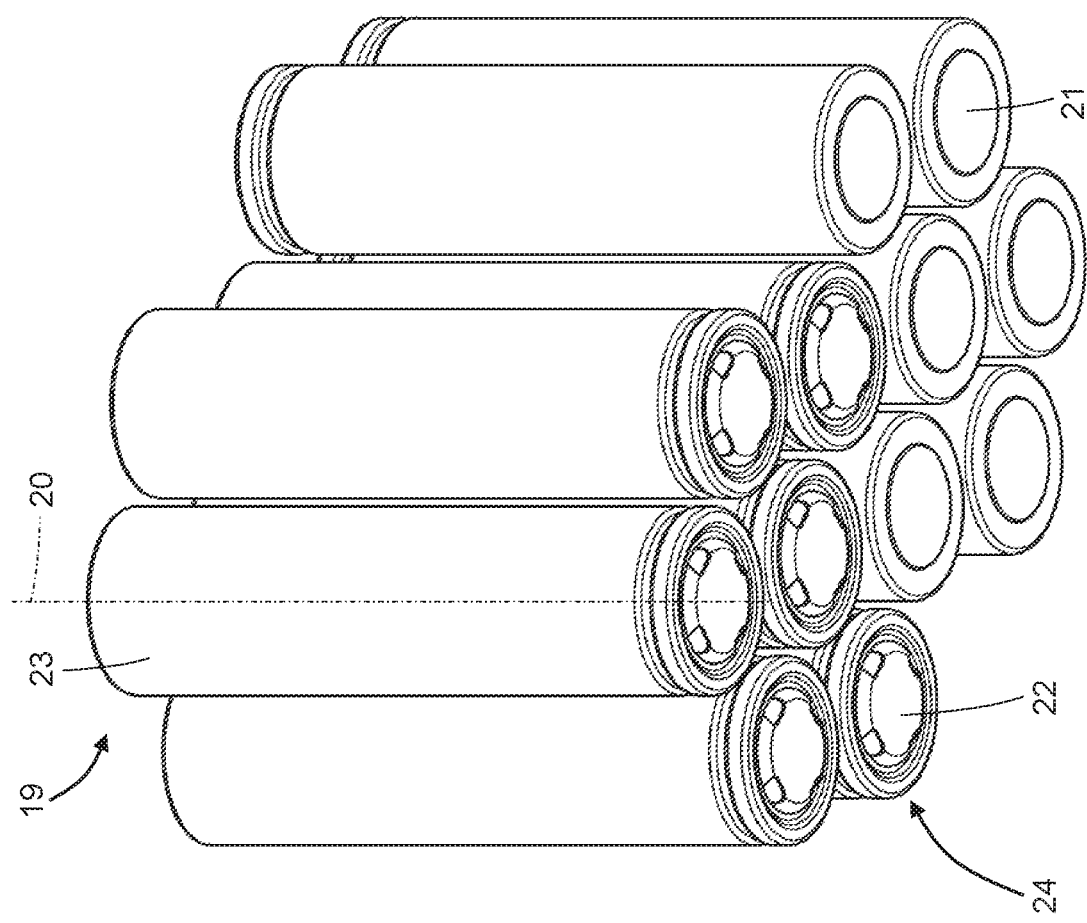
FIG. 1 is a schematic perspective view of a set of chemical batteries making up a battery module.

In the present description, the term "second" component does not imply the presence of a "first" component. These terms are in fact used only to differentiate components and should not be meant in a limiting way unless otherwise specified in the description.

PREFERRED EMBODIMENTS OF THE INVENTION

Unless specifically excluded in the following detailed description, what is described in the part relating to the prior art is to be considered as an integral part of the detailed description.

According to a preferred embodiment, the present energy storage system is based on chemical batteries 19, preferably with lithium ions ("Li-Ion").

Each chemical battery, hereinafter "battery", comprises two opposite terminals 21 and 22 emerging from the respective bases, i.e. at opposite ends of the same battery, through which the battery is designed to supply and store electrical energy in relation to its operating conditions. Each terminal defines a so-called positive pole 22 and a so-called negative pole 21. Each chemical battery 19 comprises a cylindrical electrochemical cell (not shown), and an outer shell 23, which has a substantially elongated cylindrical shape, houses the electrochemical cell keeping it compressed and is made of a material (typically metal) having a high mechanical strength. Each battery 19 is provided with a safety valve 24 (namely, a vent or overpressure valve), which is arranged at a base of the outer shell 23 near the positive pole 22 (but could also be arranged in an opposite position at the negative pole 21) and is calibrated to open when the pressure inside the outer shell 23 exceeds a predetermined safety pressure (i.e. in the event of a thermal drift of the chemical battery 19 causing the leakage of hot fluids). In other words, the safety valve 24 is a maximum pressure mechanical valve that opens when the pressure inside the outer shell 23 is too high to avoid a violent explosion of the outer shell 23.

As shown in the figures, the battery module 25 according to the present invention comprises a set of cylindrical chemical batteries 19 as described above. Their shape is substantially elongated, since the axial development is preferably much greater than the diameter of a base of the cylindrical shape. A storage system 14 can comprise one or more battery modules. Each chemical battery identifies its own rotation axis 20. The symmetry axes 20 of the chemical batteries that make up a module are all parallel to each other.

Figure 9:
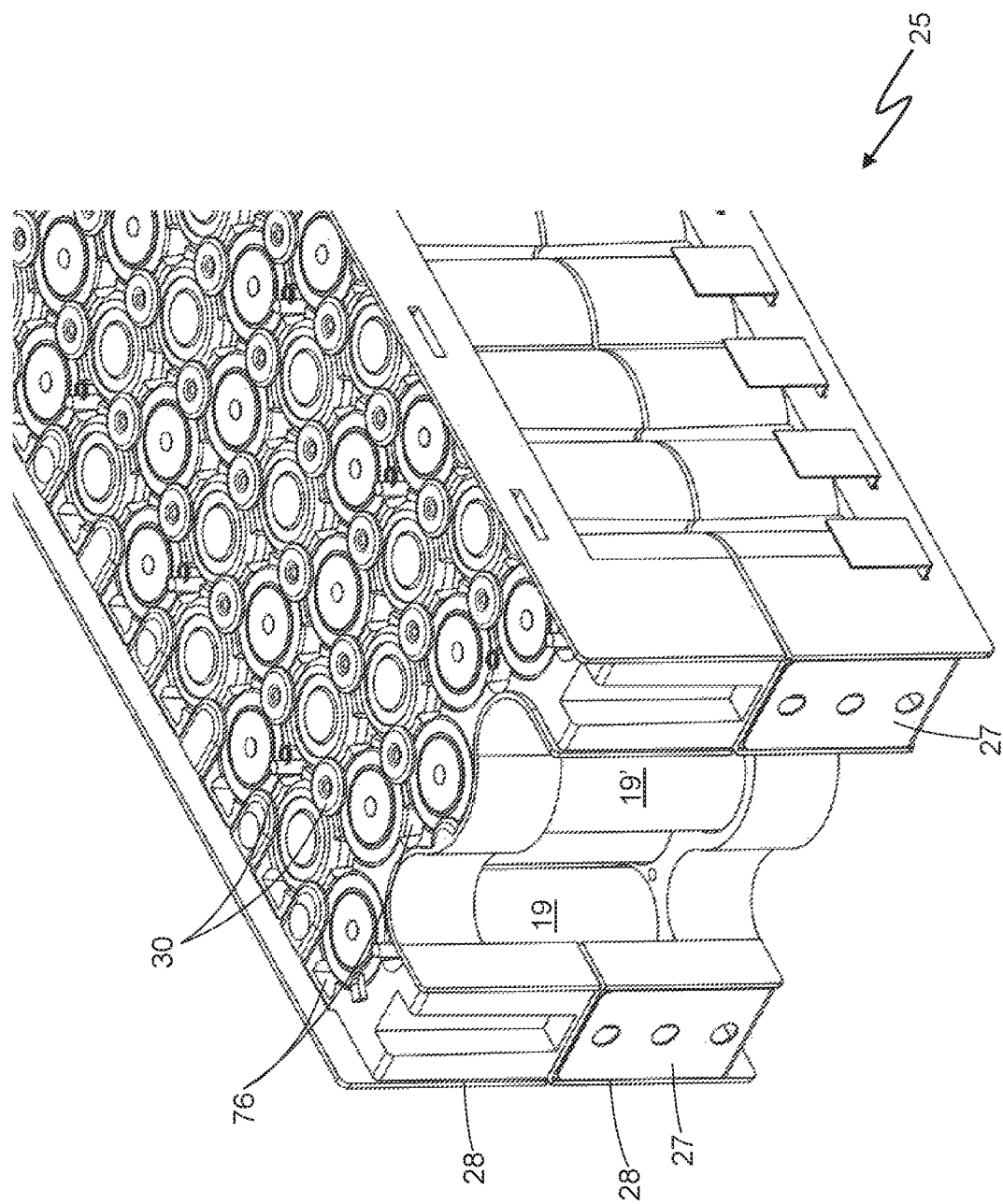
FIG. 9 shows another embodiment of a module corresponding to the view of FIG. 5.

Each module houses at least one set of chemical batteries 19. In other words, the storage system 14 can be formed by a plurality of battery modules 25 arranged side by side, in which, for example, a module is like the one shown in FIGS. 1, 5-7, or can be formed by a single module, e.g. as shown in FIG. 9.

The battery modules 25 can all be identical to each other, i.e. housing the same number of batteries, or can be different from each other to compose a module or a composition of modules of a predetermined shape and size. This is advantageous to make the most of the space available on the road vehicle floor panel.

The battery module 25 comprises two supporting bodies 28 coupled to opposite ends of the set of chemical batteries 19 to provide a stable mechanical support to the chemical batteries 19 at least during the manufacture of the battery module.

These bodies define two substantially symmetrical shells designed to house the batteries.

The opposite terminals of the set identify opposite sides of the same set.

Figure 2:
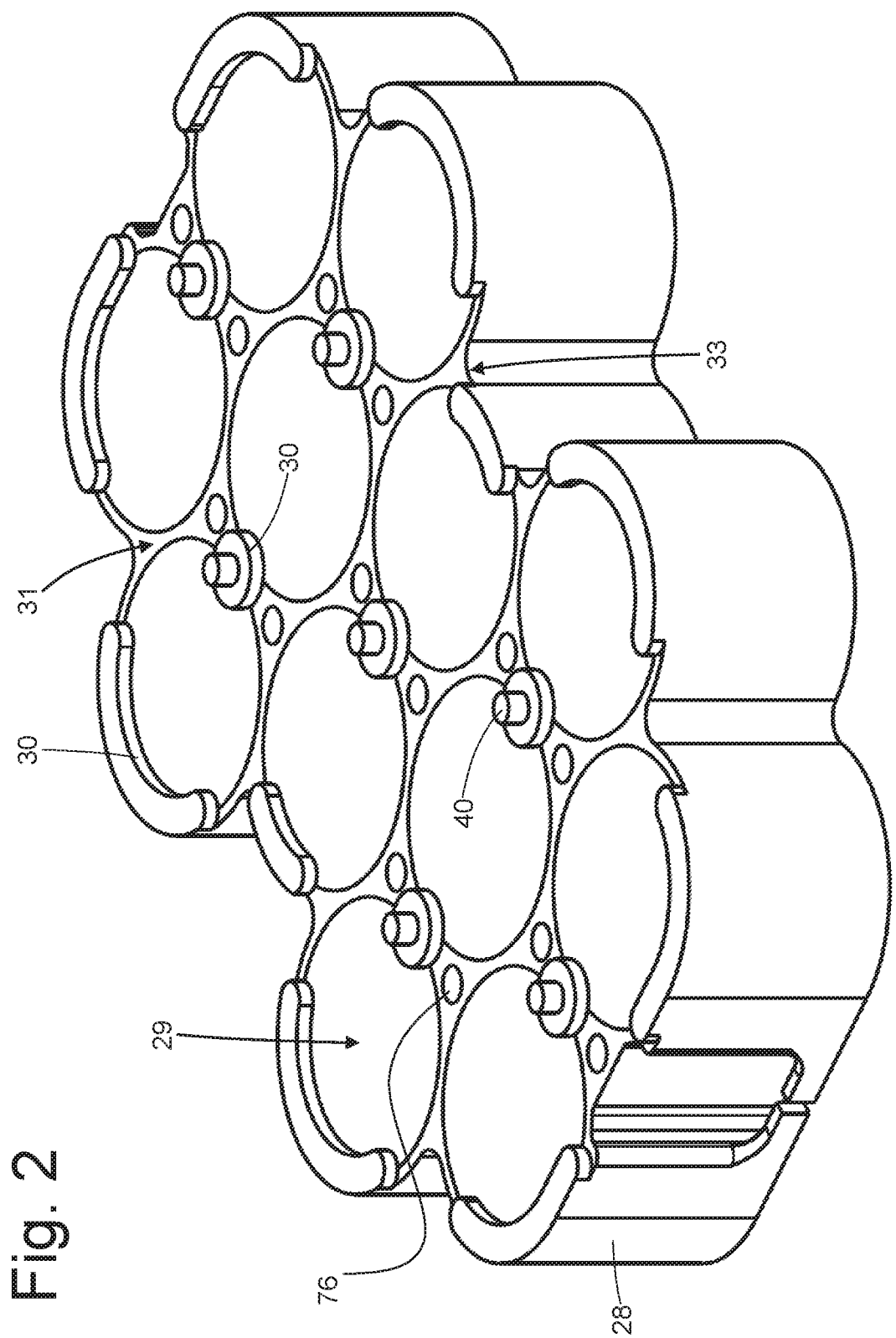
FIGS. 2 and 3 show two perspective views of two opposite faces of a supporting body of the set of FIG. 1.
Figure 3:
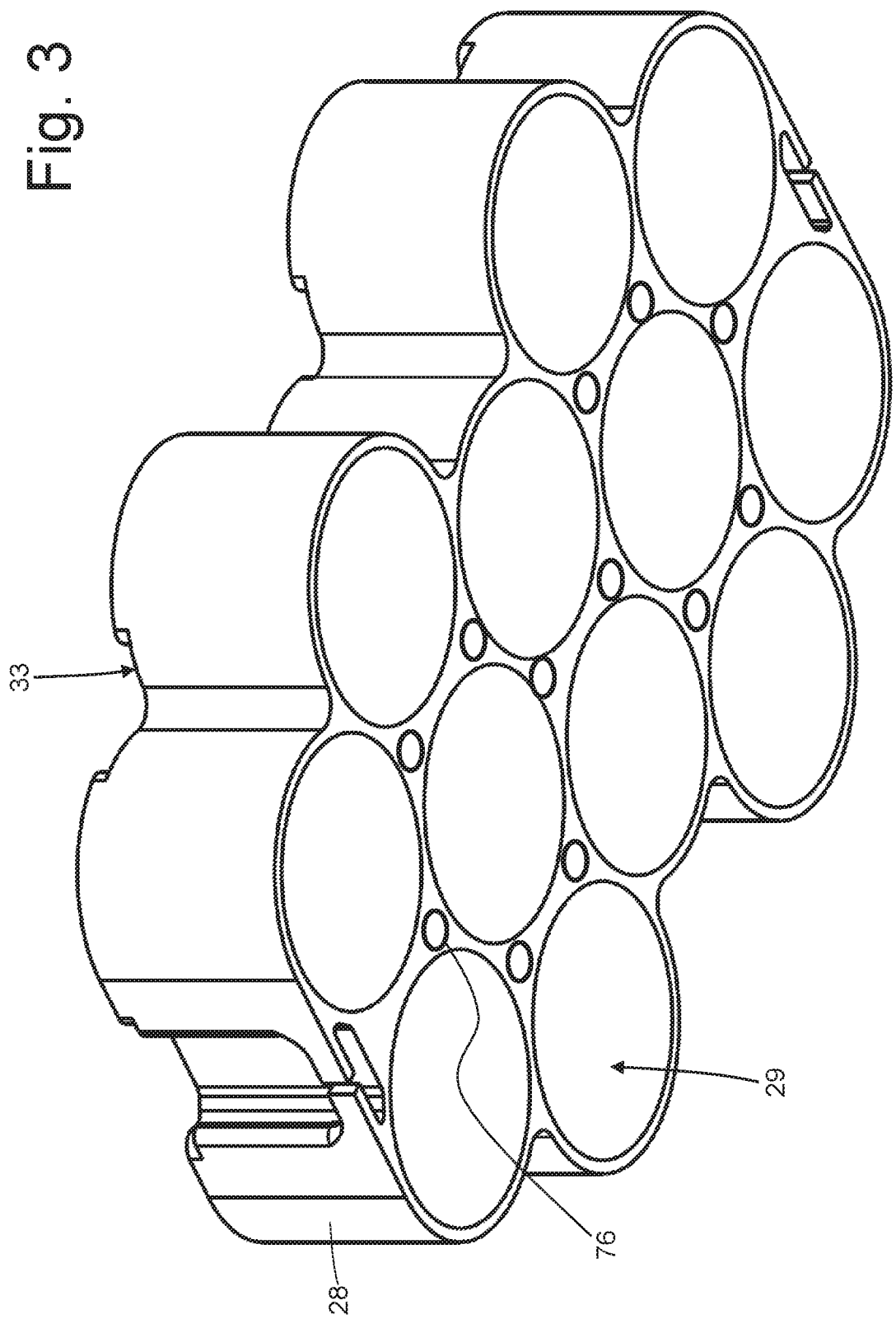
Figure 4:
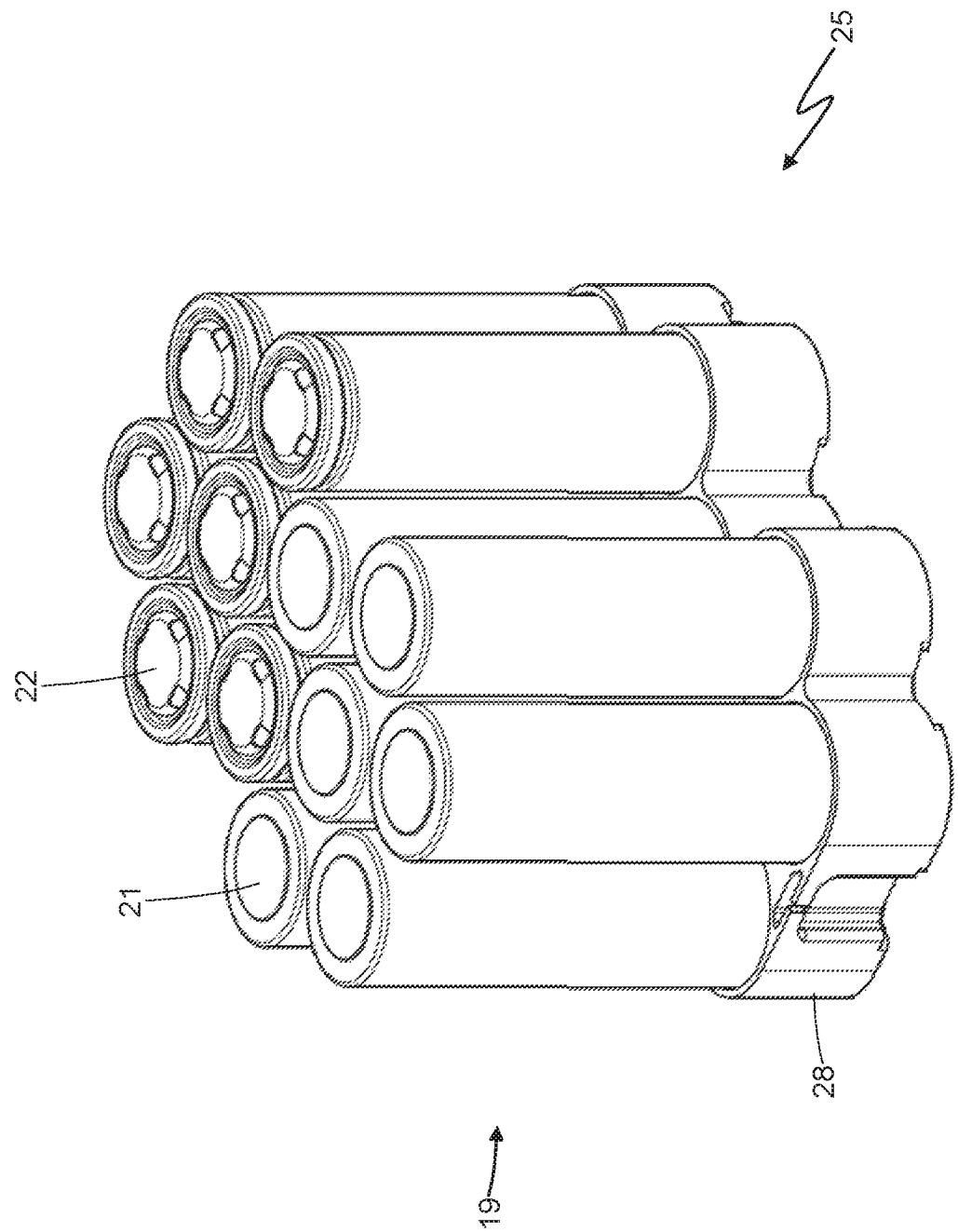
FIG. 4 shows a perspective view of the set of chemical batteries of FIG. 1 associated with a first supporting body according to FIGS. 2 and 3.

According to what is best shown in FIGS. 2 and 3, each supporting body 28 has a plurality of tubular seats 29 housing at least the ends of the chemical batteries 19 and a plurality of arrest elements 30, which are arranged at an outer face of the supporting body 28 and hold the chemical batteries 19 inside the corresponding tubular seats 29. In other words, the arrest elements 30 of each supporting body 28 are arranged at an outer end of the supporting body 2 and prevent the chemical batteries 19 from passing through the respective seats, preferably so that the chemical batteries 19 are "stapled" between the arrest elements 30 of the two supporting bodies 28.

Figure 5:
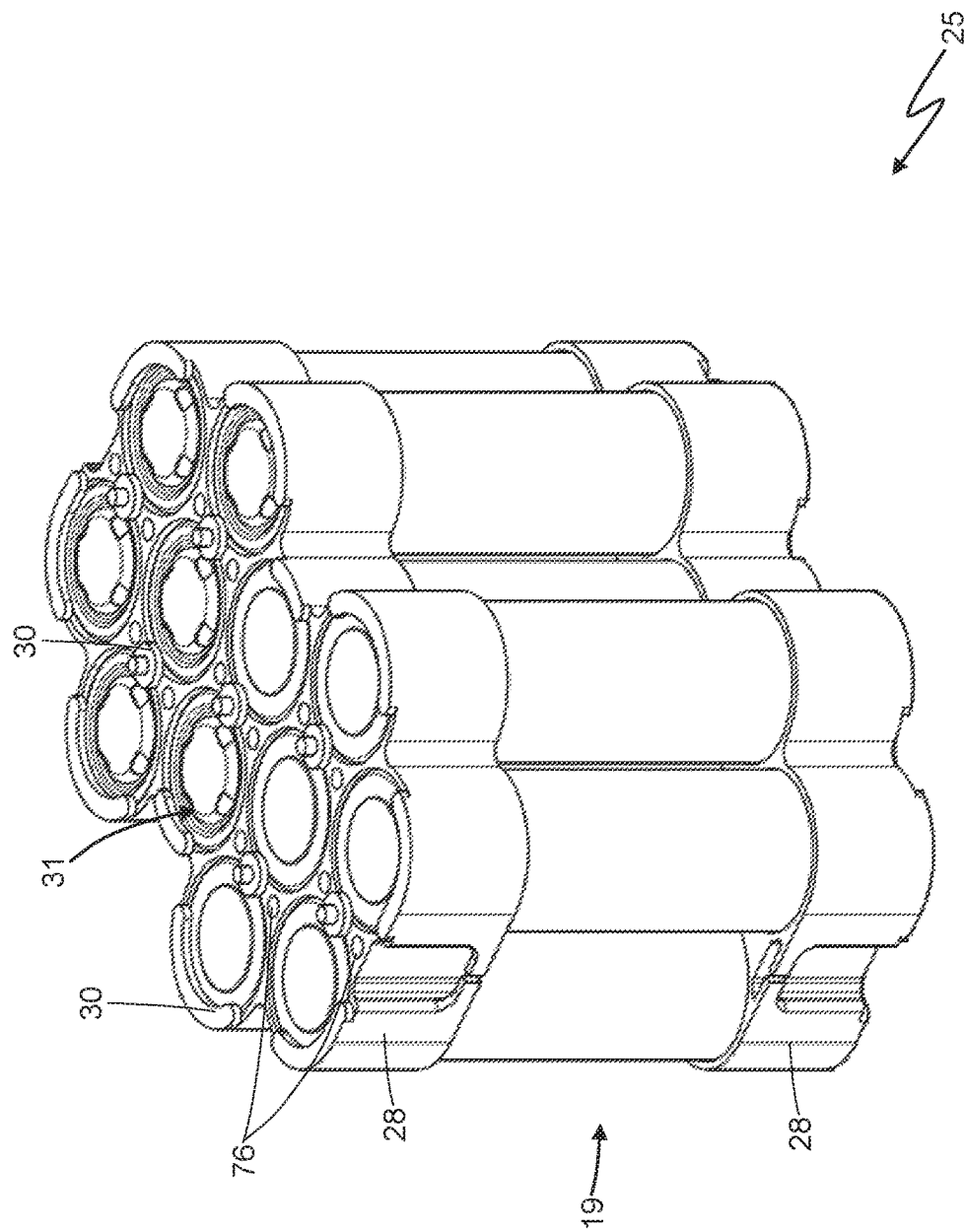
FIG. 5 shows a perspective view of the set of chemical batteries of FIG. 4 also associated with a second supporting body according to FIGS. 2 and 3.
Figure 6:
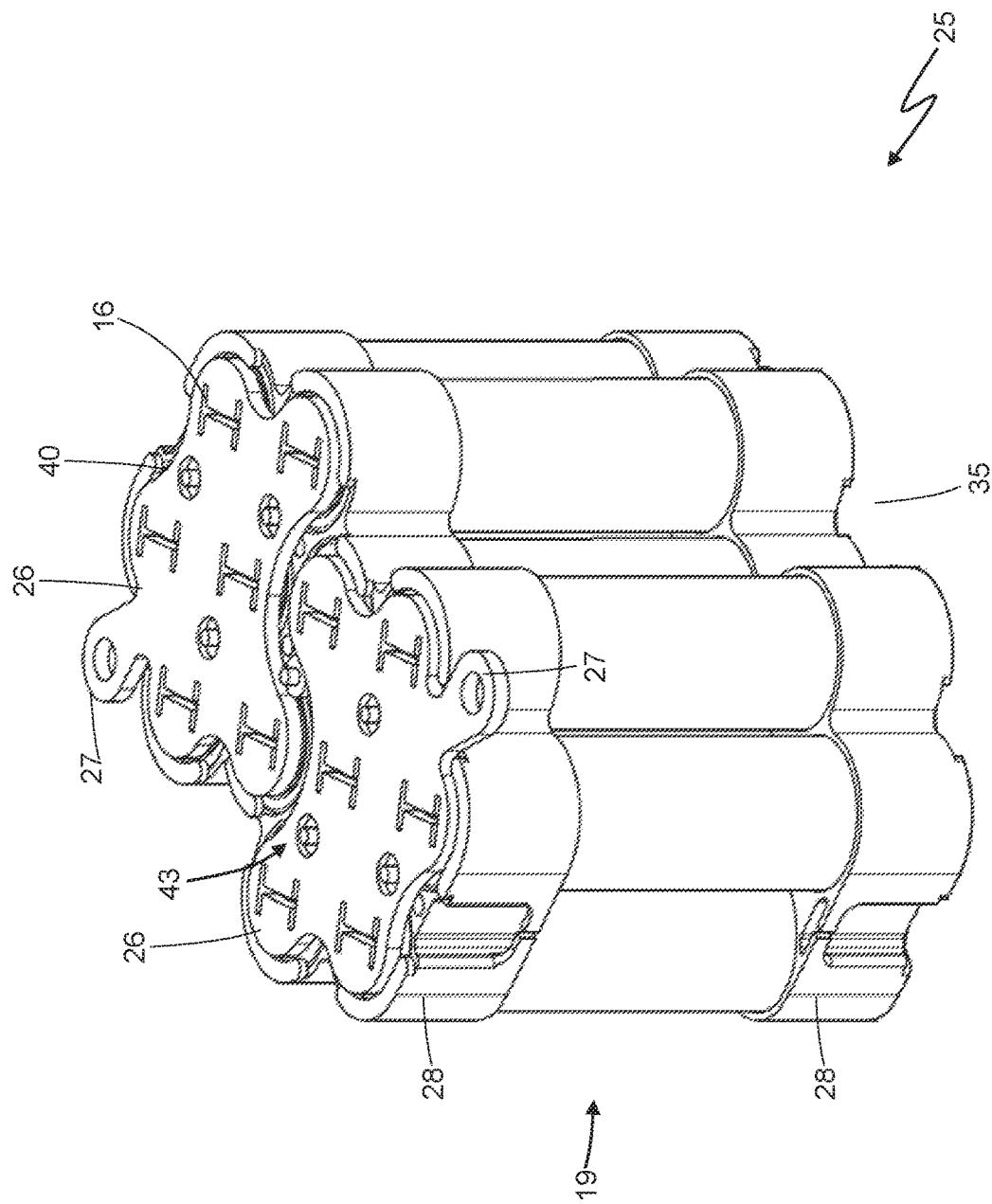
FIG. 6 shows the addition of electric connection conductive plates associated with said second body of FIG. 5.

FIG. 2 shows the outer face of the supporting body 28, whereas FIG. 3 shows the inner face of the supporting body 28. The terms inner and outer take into account the corresponding positioning of the parts when the battery module is at least partially assembled, as shown in FIG. 5.

In each supporting body 28, the arrest elements 30 are arranged both at the outer edge of the supporting body 28, shaped as circular sectors, and in the central part of the supporting body 28, shaped like an ellipsoid to simultaneously interfere with the ends of one or more adjacent chemical batteries 19, so that the ellipsoid-shaped arrest elements are arranged in the central part of a supporting body 28, astride one, two or more tubular seats 29 arranged side by side, e.g. astride three tubular seats 29 arranged side by side.

The outer face of the support element 28, leaving aside the arrest elements 30, defines a substantially flat but discontinuous surface.

This substantially flat surface houses at least one corresponding conductive plate 26 for the electric connection of the terminals 21 and/or 22 of the batteries 19 defining the set of batteries.

Therefore, also the conductive plates 26 are flat.

Preferably, but not necessarily, in each flat seat 31 the arrest elements 30 arranged at the outer edge of the supporting body 28 also act as side edges laterally holding the corresponding conductive plate 26.

FIG. 5 shows the conductive plates 26 superimposed on the outer surface of the upper body 28. The upper end can be deduced from the orientation of the module in the same drawing.

These conductive plates are provided with H-shaped through openings, which allow the laser-welding of the plate with the terminals 21 and 22 of the corresponding batteries.

Figure 10:
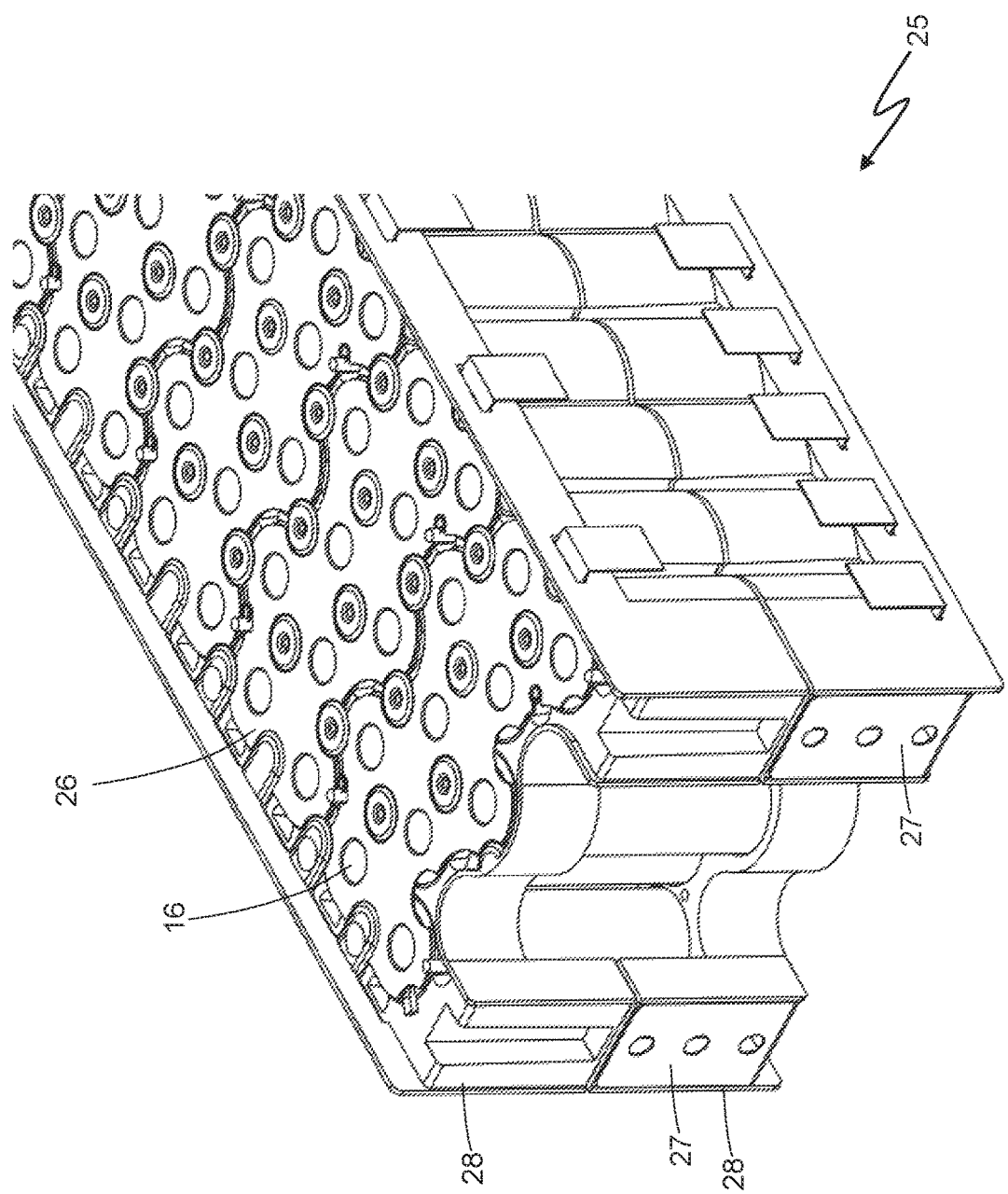
FIG. 10 shows another embodiment of a module corresponding to the view of FIG. 6.

According to a preferred variant of the invention, the conductive plate 26 is provided with circular through openings at each relative cylindrical battery terminal, as shown in FIG. 10. This allows carrying out a laser-welding along the circumference of the circular opening by welding the terminal 21, 22 to the conductive plate. The width of this opening is the maximum possible in relation to the shape of the battery terminal. This advantageously allows making a very large weld that reduces the relative resistance, both from an electrical and from a thermal point of view. Therefore, an optimal heat exchange is achieved between the batteries 19 and the relative conductive plates 26.

When both conductive plates are welded to the battery terminals of a set, the same set of batteries, together with the supporting bodies 28 and the plates 26, becomes a single piece. When the two supporting bodies 28 (shells) are made in a single body extending between the opposite ends of the relative batteries, as previously stated, only one outer face is provided with arrest elements. By welding the conductive plates 26 on both outer faces of the battery terminals, this is enough to manufacture a single body.

As shown by all the figures, the set of batteries is arranged in rows, i.e. alignments. In order to improve the packing, these alignments are offset, i.e. one row is displaced by half a battery with respect to an adjacent row to allow an optimal packing of the cylindrical shapes of the batteries. Although the support structure described here is made by means of two separate shells 28, they could be made in one piece. Obviously, one of the two outer faces must lack the arrest elements 30 to allow the insertion of the batteries in the support structure.

The battery module comprises two respective clamps 27, which preferably protrude outside the battery module 25 and are designed to provide an outer electric connection of the battery module 25.

According to the module shown in FIG. 10, many conductive plates 26 are provided to form different sub-sets of chemical batteries 19, for example, so that in each sub-set the batteries are connected to each other in parallel whereas the different sub-modules are connected in series. Obviously, when the batteries are connected in parallel they have the same orientation, namely they converge with the same positive pole on the same electric plate.

Conversely, the batteries belonging to two consecutive sub-sets in series have an opposite orientation. Further ways of connecting the chemical batteries 19 of the battery module 25 are also possible.

Figure 7:
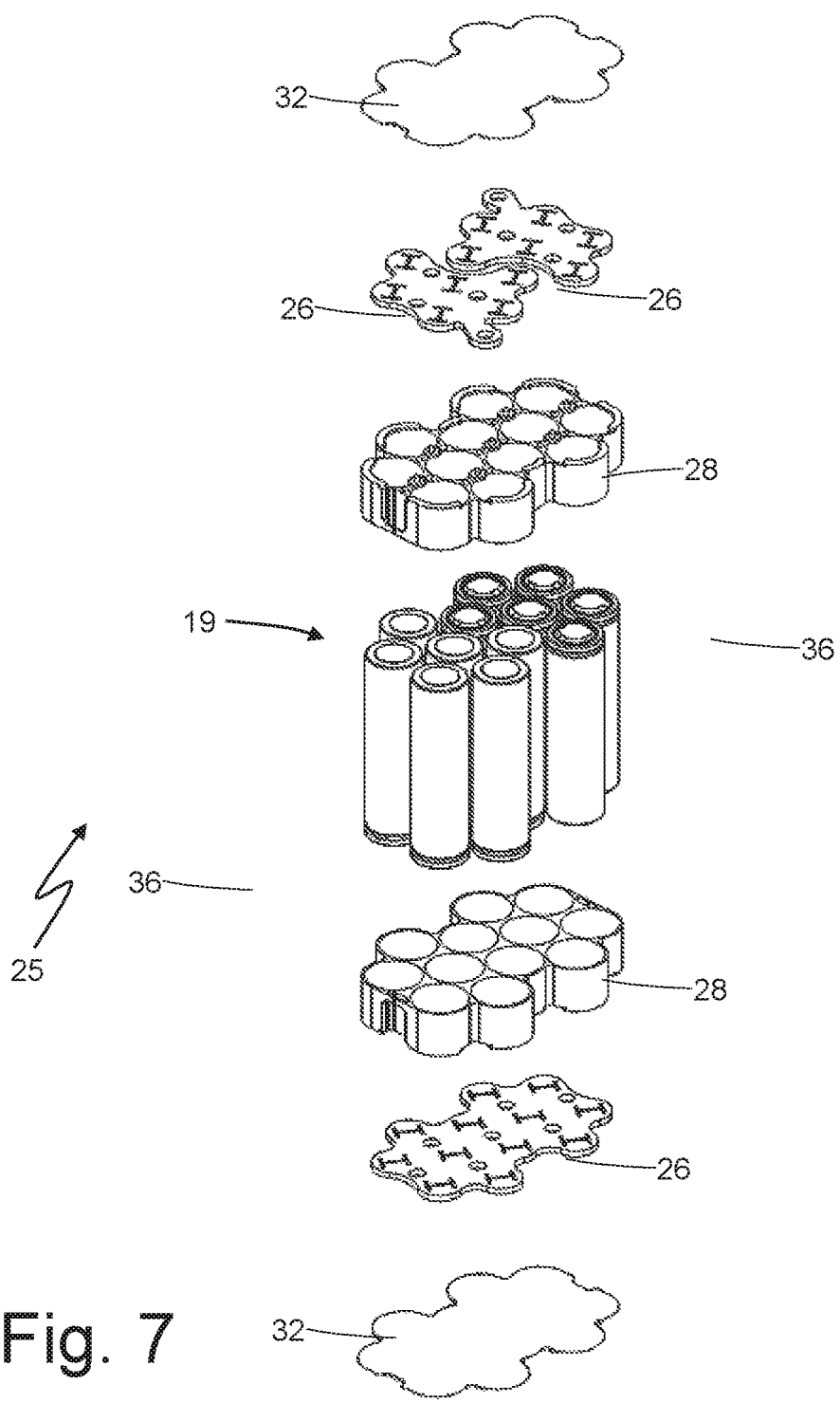
FIG. 7 shows a partial exploded view of the module of FIG. 6 showing two further end components.
Figure 11:
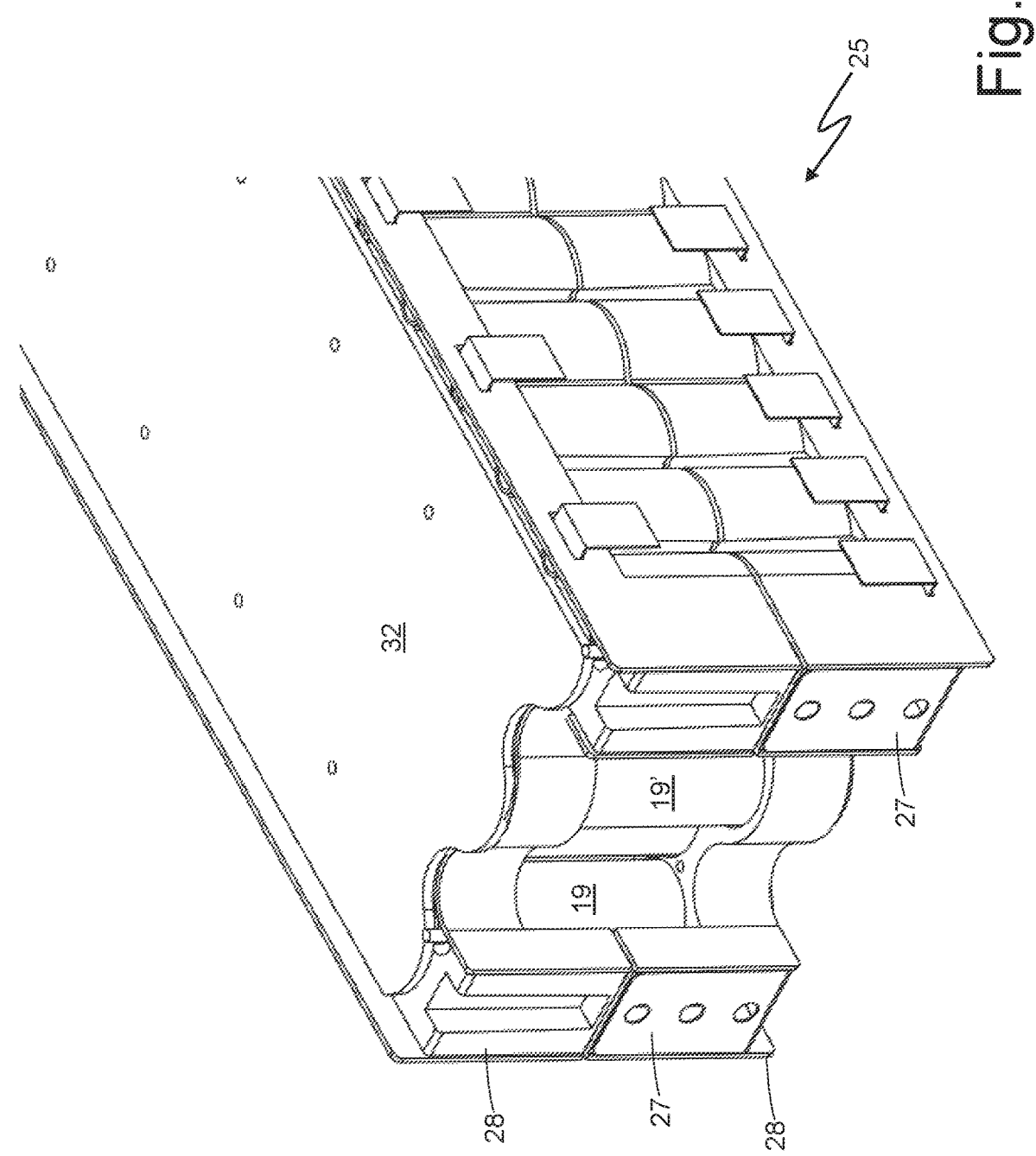
FIGS. 11 and 12 show the module of FIG. 7 progressively comprising further components until obtaining a complete configuration.
Figure 12:
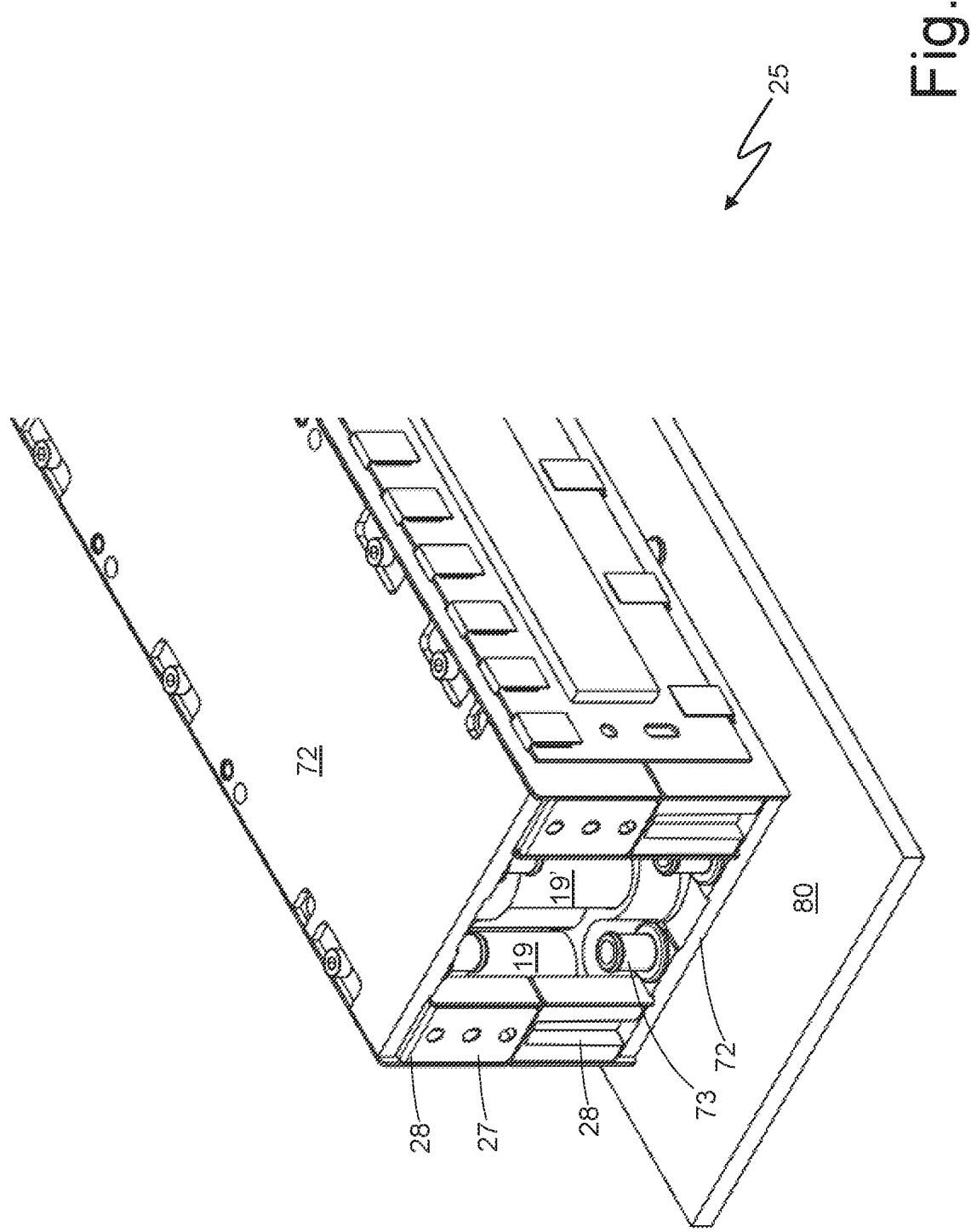
Figure 13:
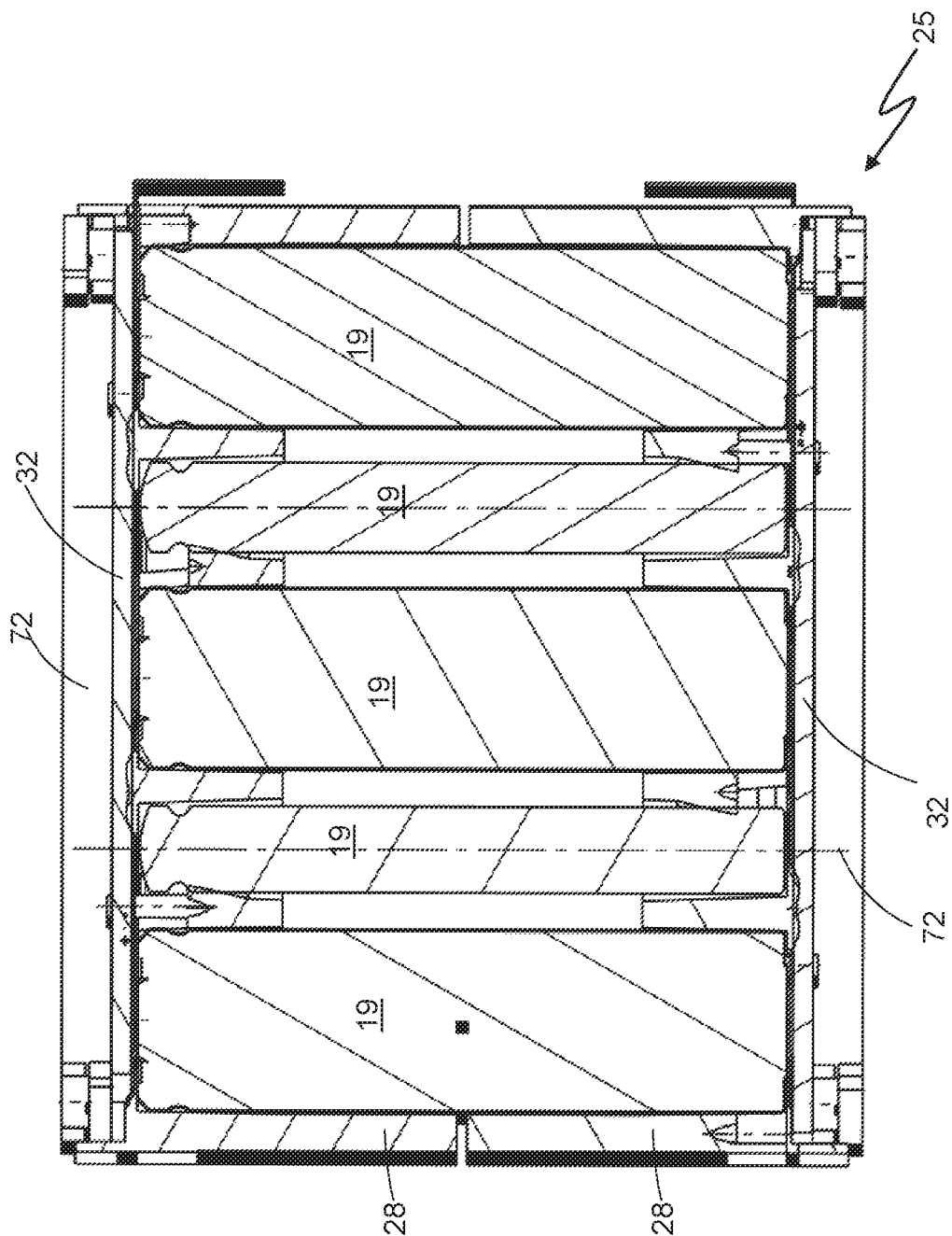
FIG. 13 shows a side view according to the arrow L of FIG. 12.
Figure 14:
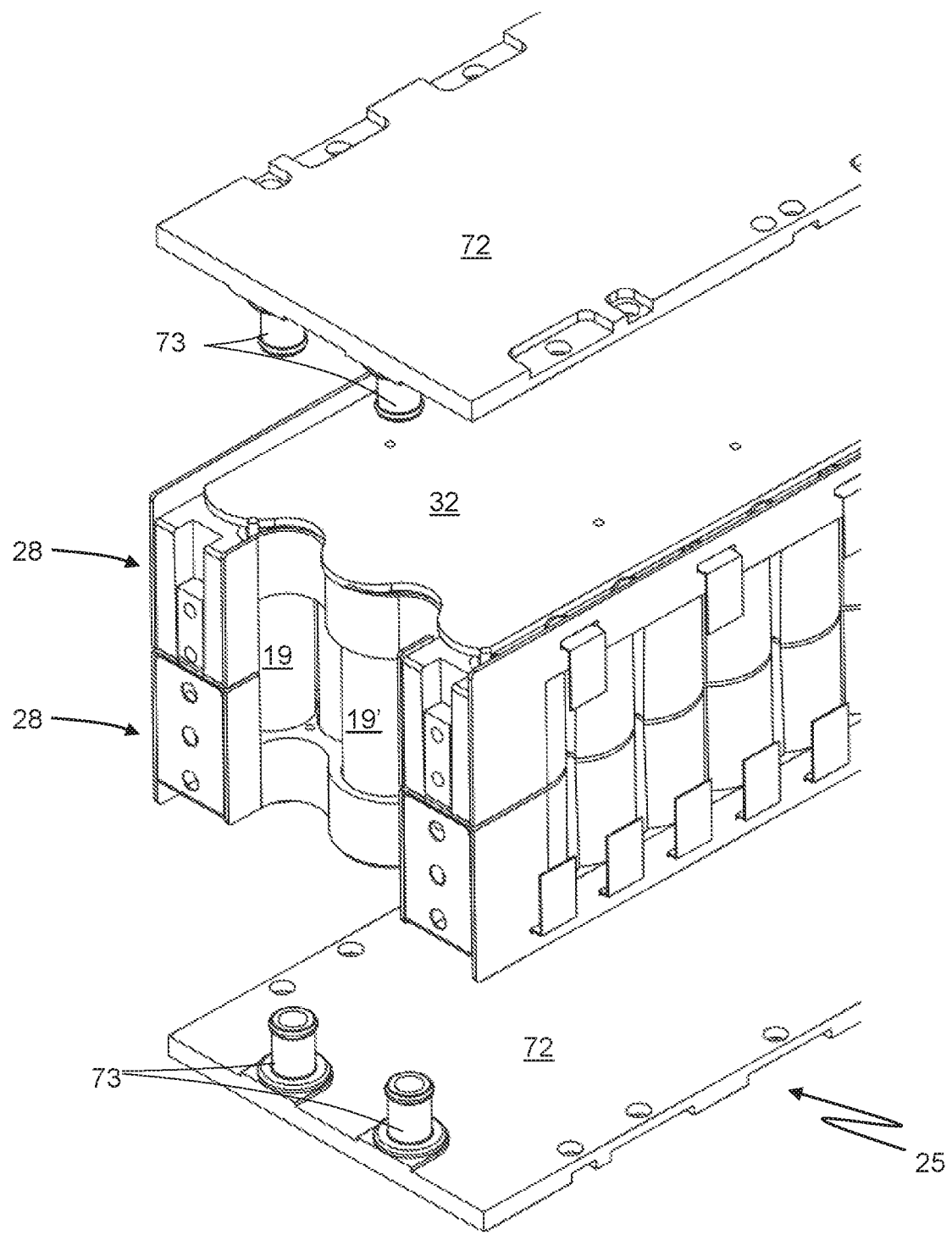
FIG. 14 shows a perspective view of an exploded view showing some of the components of FIG. 12.
Figure 15:
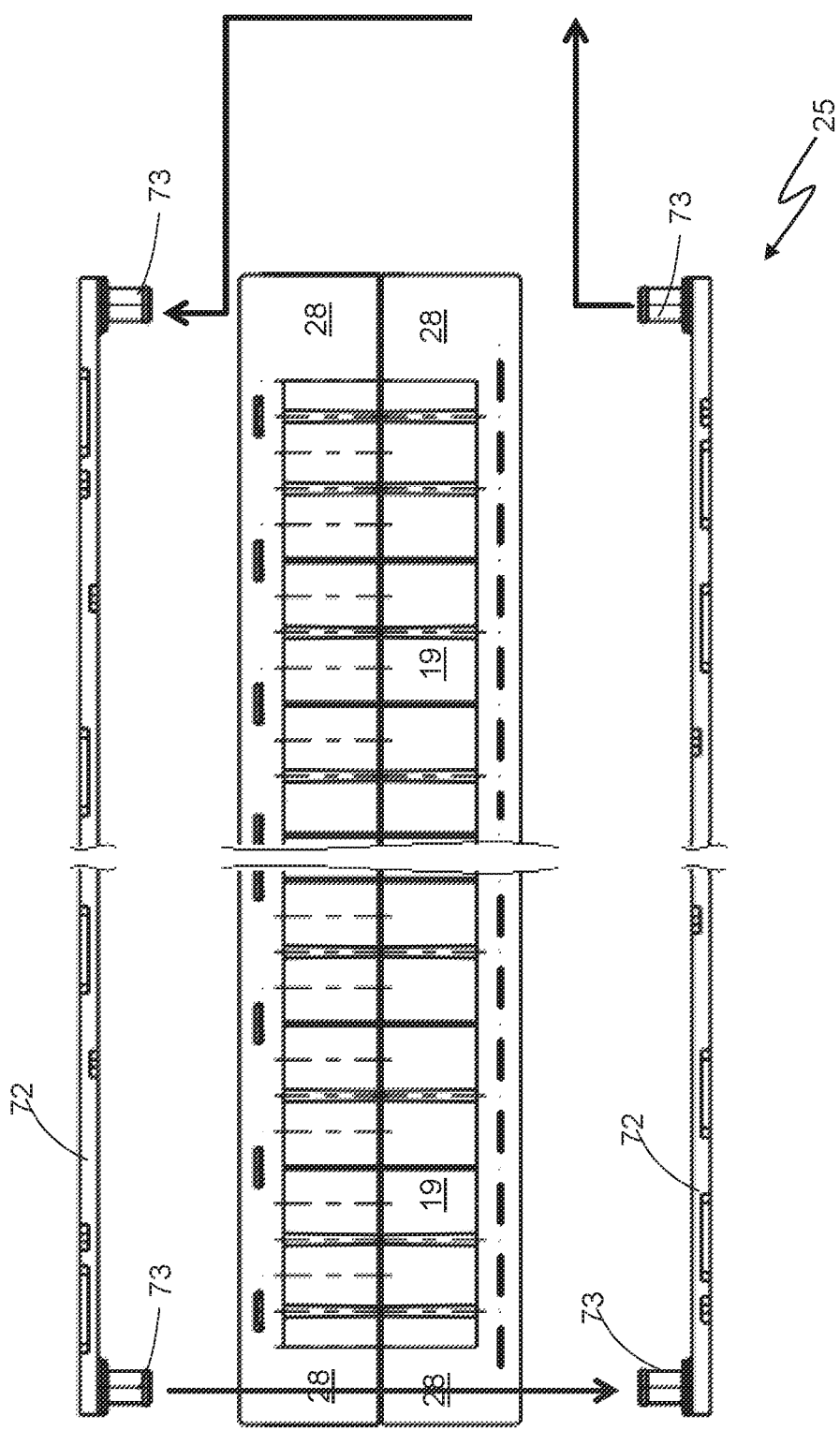
FIG. 15 shows a side view of the exploded view of FIG. 14.

As shown in FIGS. 7, 11 and 14, each battery module 25 comprises two pads 32 that are superimposed on the at least one conductive plate 26 on both outer faces of the shells 28.

These pads 32 are physically in contact with as many refrigerated walls 72. These walls preferably extend to cover all the conductive plates to remove the heat collected by the conductive plates, generated by the electrochemical processes caused by the storage/supply of electrical energy inside the chemical batteries.

The battery module is preferably in the shape of a parallelepiped. Nevertheless, it is a straight prism whose bases can have any shape, rectangular, triangular, polygonal.

According to the example of FIGS. 8-18, the clamps 27 are folded on a perpendicular side with respect to the plane of the conductive plates 26, adhering to a supporting body 28. The clamps 27 shown, for example, in FIG. 9 are electrically connected to the same conductive plate 26. Preferably, they are made in one piece with it and are obtained by shearing and press-bending a metal plate.

Each of the clamps comprises at least one threaded hole 90 for connecting electric cables. Advantageously, having as many as two clamps for each pole of the module 25 allows reducing a relative contact resistance when connected to the electric connections for the module connection, such as for example electric cables (not shown).

Figure 8:
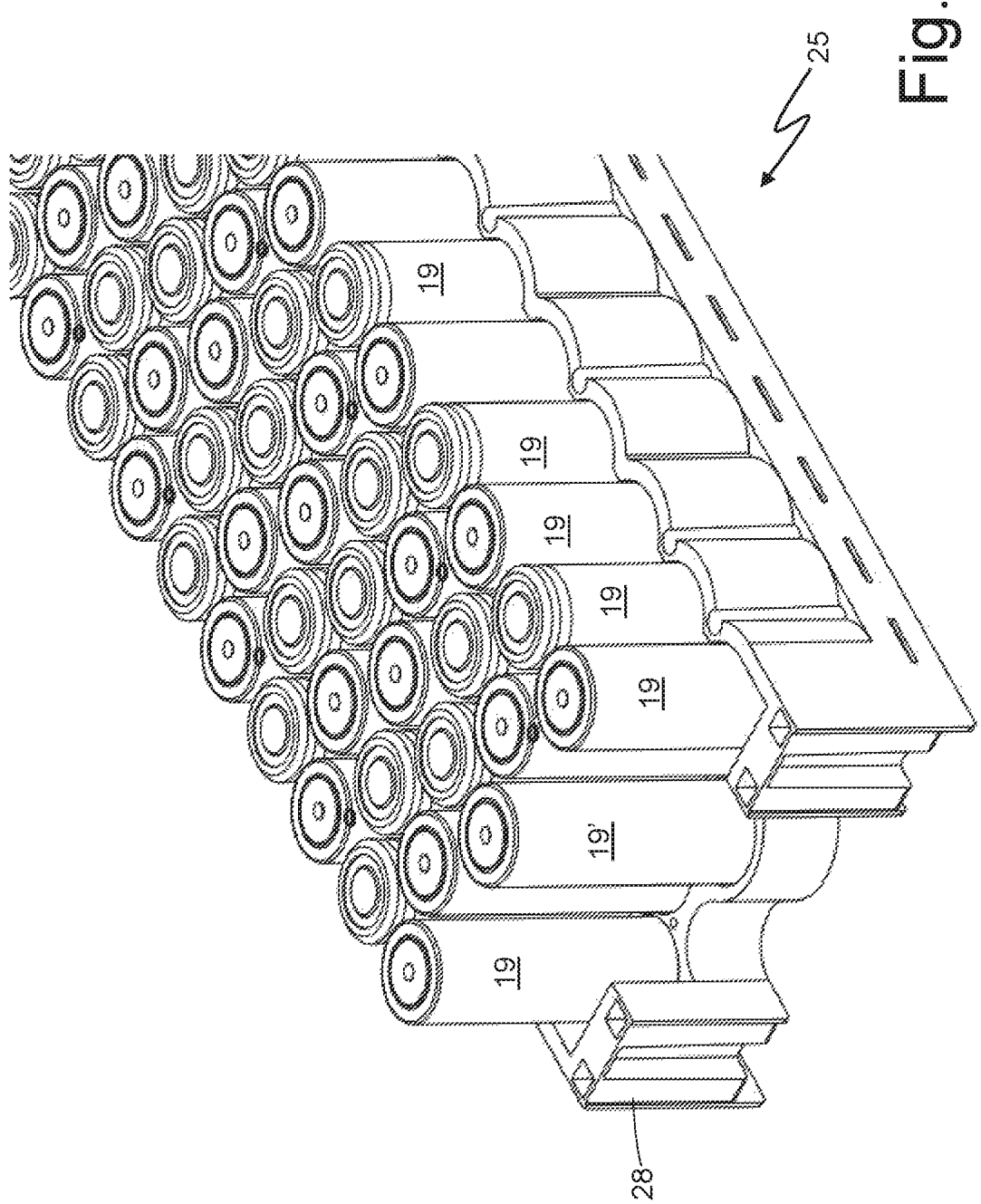
FIG. 8 shows another embodiment of a module corresponding to the view of FIG. 4.

The other pole is advantageously arranged on a face of the module 25, opposite and not shown with respect to the one provided with the clamps 27 of FIG. 8 and following.

With regard to the electric connections formed by the conductive plates 26 and by the number of sub-modules, the clamps 27 of the other pole (not shown) can be supported by the same supporting body 28 of the clamps shown, or by the other supporting body 28.

In any case, the opposite terminals of a set of batteries identify two parallel envelope surfaces. These envelope surfaces identify opposite sides of the battery module.

The refrigerated walls 72 are applied to these opposite sides. Both when one side is refrigerated and when both sides are refrigerated. The pad is made of a material capable of adhering to the surfaces of the conductive plates, having a high degree of electrical insulation and a high thermal conductivity. Materials of this kind, for a preferred application of the invention, are known under the tradename of Thermipad® and have a thermal conductivity greater than 0.2 W/mK, preferably between 5 W/mK-15 W/mK and an electrical insulation greater than 10V/mm and preferably between 6-15 kV/mm.

The pad must also guarantee the electrical insulation between the conductive plate and the refrigerated wall in case of mechanical stress.

The term "pad" is preferably used as a suitable resilience is desired for a better adherence to the conductive plates and to the refrigerated walls.

The pad can be formed by a single layer or by several layers having different physical properties.

The pad can for example be a plastic material wafer interposed between two layers of material being of an order of magnitude more resilient than the intermediate layer. It can be used insulating films or sprays having thicknesses of less than 0.1 mm that do not jeopardize the thermal conductivity between the refrigerated wall and the conductive plate.

Preferably, the overall thermal conductivity between conductive plates and refrigerated wall must be greater than 100 $W/(m^2)K$.

According to a preferred aspect of the present invention, the thickness of the pad is selected simultaneously to:
- meet the requirements of electrical insulation and thermal conductivity between the conductive plate and the refrigerated wall;
- compensate for the manufacturing tolerances of the components that make up the module.

In fact, the batteries have non-negligible manufacturing tolerances and therefore a battery can be significantly longer than others can.

This can result in a non-perfect alignment between a conductive plate and a relative refrigerated wall or in deformations in the same conductive plate.

Therefore, the pad allows compensating for these constructive tolerances and at the same time it allows optimizing a thermal exchange between the conductive plate and a relative refrigerated wall, expelling the air that, as already known, is a thermal insulator.

It is therefore clear that the pad, regardless of the material composing it and of the number of layers that make it up, must be relatively resilient with respect to the rigidity of the refrigerated wall and of the conductive plate. In other words, by reciprocally compressing the refrigerated wall against the relative conductive plate, the pad represents the part that must yield fitting into the available spaces, while maintaining its own characteristics of electrical insulation.

In this context, it is clear to the person skilled in the art what is meant by a pad made of resilient material or "relatively yielding", since "relatively" is to be meant not in absolute terms but with respect to the "relative" stiffness of the refrigerated wall and of the conductive plate between which the pad is sandwiched.

Advantageously, the heat generated in the chemical batteries 19 is removed through the terminals 21, 22 of the batteries. In fact, the outer casing 23 and the various insulating layers inside the batteries make heat dissipation more difficult, while the terminals, evidently metallic, are the optimal heat evacuation path.

Studies carried out on chemical batteries 19 have shown that the two terminals are not equivalent in terms of thermal conductivity.

Since the connection requirements do not allow having all the batteries oriented in the same way, it is further advantageous to use two opposite refrigerated walls 72, i.e. facing the opposite ends of any one of the batteries 19 of the set.

According to a preferred variant of the invention, each of the refrigerated walls comprises an inner cavity through which a coolant can circulate. The fluid can fill the entire volume defined by the same wall or it can circulate in a coil. According to a preferred variant of the invention, each refrigerated wall comprises planar turbulators arranged inside it to optimize the heat exchange with the coolant. According to this preferred variant of the invention, the circulation of the coolant is U-shaped, meaning that the two refrigerated walls 72 are connected in series.

This implies that each chemical battery 19 is subjected to an identical heat exchange power gross of the different intrinsic thermal resistance between the positive and the negative poles. The coolant shows an almost even heat absorption when flowing through the refrigerated walls, having an increasing temperature profile from the inlet to the outlet, so that the average of the temperature differences between the terminals 20, 21 of the chemical battery and the respective refrigerated walls is almost constant among all the chemical batteries of the module, thus obtaining an even absorption of thermal power.

Each of the refrigerated walls 72 comprises hydraulic connectors 73, which project perpendicularly with respect to the plane of the wall 72 at opposite edges of the same wall. When the module is assembled, the hydraulic connectors 73 are turned towards the inside of the module.

As shown in FIG. 14, for example, the offset alignment of the batteries 19 determines, when the alignments are in odd numbers, that the side surface of the foremost battery of the central alignment, indicated with 19', projects laterally. Both refrigerated walls have a pair of hydraulic connectors 73, which are complementary to said foremost battery of the central alignment.

On the opposite side of the module (not shown), the situation is reversed, so that the rearmost battery of the central alignment is recessed between two adjacent alignments. The refrigerated walls 72 on the opposite side are each equipped with a single central hydraulic connector 73, complementary with the rearmost battery of the central alignment.

The pair of hydraulic connectors is preferably symmetrical with respect to an axis of the refrigerated wall, which has a rectangular shape, as described above in the case of a parallelepiped. Nevertheless, depending on the available space, the module can take the form of straight prism with a base of any shape and therefore also the hydraulic connectors can be arranged in any position, but always preferably complementary with the packing of the chemical batteries 19.

Advantageously, this allows making identical refrigerated walls, thus simplifying the production of the storage system.

Figure 16:
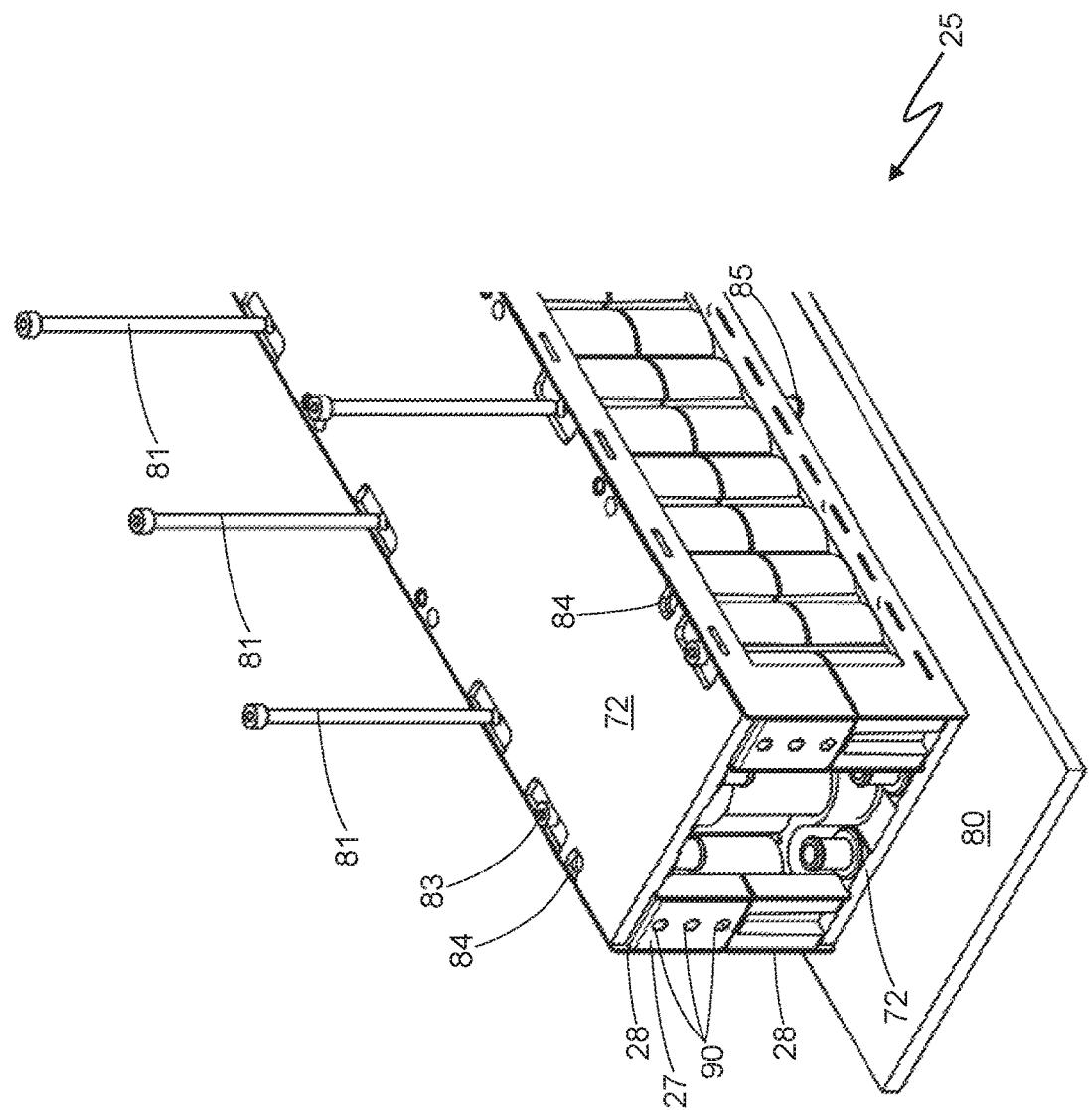
FIG. 16 shows an exploded perspective view, similar to FIG. 12, relating to fastening parts of the module of the preceding FIGS. 8-15.

According to a further preferred aspect of the invention, which can be implemented in combination or not with the previously described variants of the invention, the refrigerated walls are compressed onto the respective pads 32 to ensure a suitable heat exchange by means of screws 81 passing perpendicularly to the planes of the refrigerated walls that connect the battery module to a portion 80 of the vehicle floor panel, see FIG. 16.

In other words, the same screws 81 perform a dual function:
- keeping assembled the battery module so that the refrigerated walls properly compress the relative pads, and
- keeping the battery module connected to the portion 80 of the vehicle floor panel.

For this reason, these screws 81 are indicated below as compression and installation screws.

To simplify the handling of the battery module, a few screws 83, for example M4, can be provided, which take hold on the refrigerated walls while keeping the module globally packaged, although the packing force is not sufficient to compress the pads.

For this reason, said screws 83 are indicated hereinafter as assembly screws.

Therefore, if maintenance of the battery module 25 described above is required (e.g. to replace a defective chemical battery 19) the operation can be performed very quickly with the use of a few conventional tools.

Obviously, a refrigerated wall is close to the portion of floor panel, while the opposite refrigerated wall is far from the floor panel. The aforementioned screws 81 take hold on said refrigerated wall far from the floor panel and on the floor panel by exerting a compression force that is obviously perpendicular to the plane of the refrigerated walls. Substantially, the outer refrigerated wall takes hold on the floor panel to compress the intermediate components of the battery module.

Preferably, an insulating layer that can also be made of air is interposed between the near refrigerated wall and the portion of floor panel by using suitable spacers 85.

Preferably, but not necessarily, along an edge of the module, the assembly screws 81 alternate with compression and installation screws.

With reference to FIG. 16, the refrigerated wall 72 far from the portion 80 of the floor panel comprises threaded and blind holes 84.

These threaded and blind holes 84 are useful if a further module 25' to be stacked on the first module 25 has to be fastened to the same portion of floor panel 80.

Figure 17:
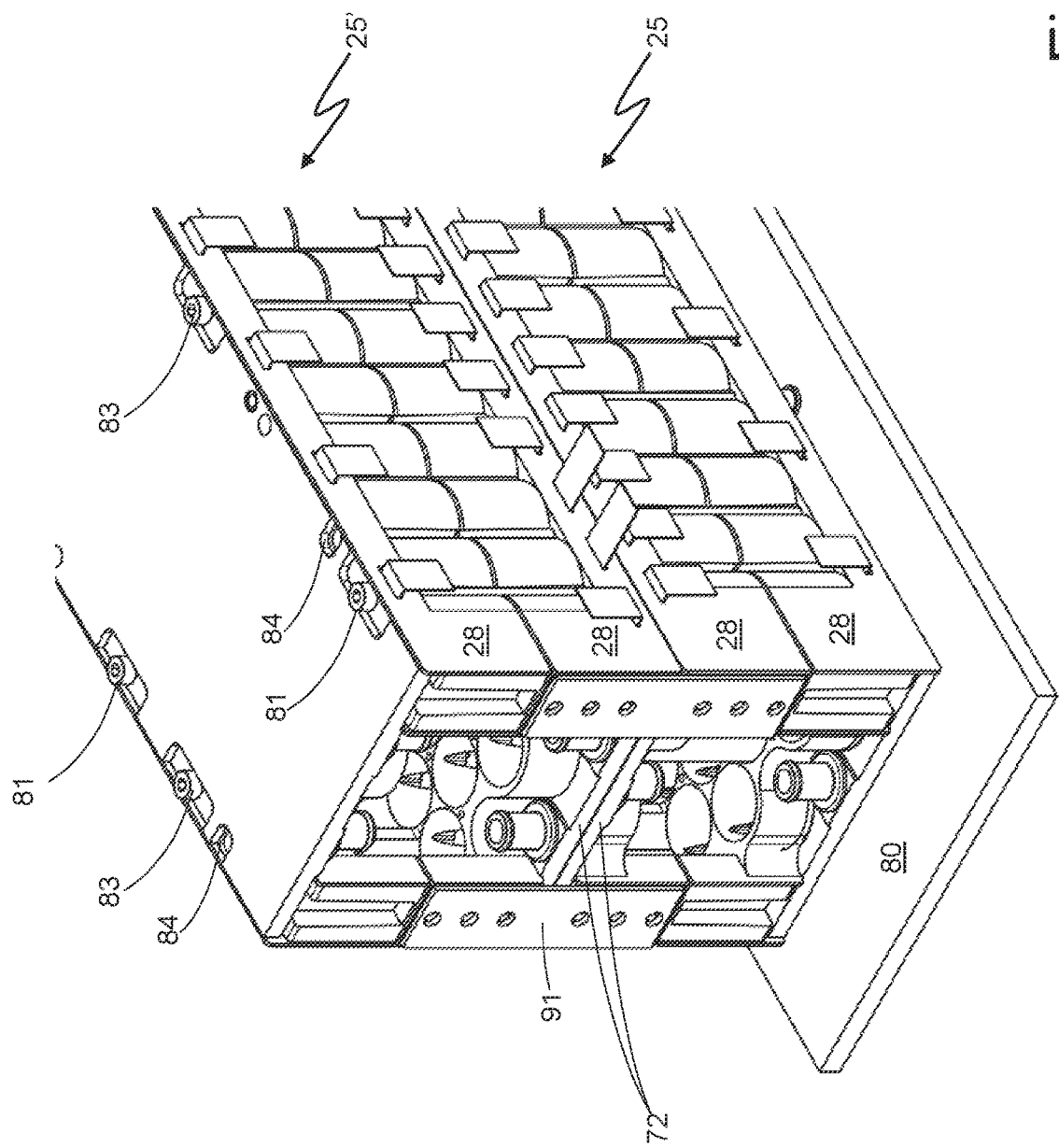
FIG. 17 shows a perspective view of a stack of modules according to the example of the preceding FIGS. 8-15.
Figure 18:
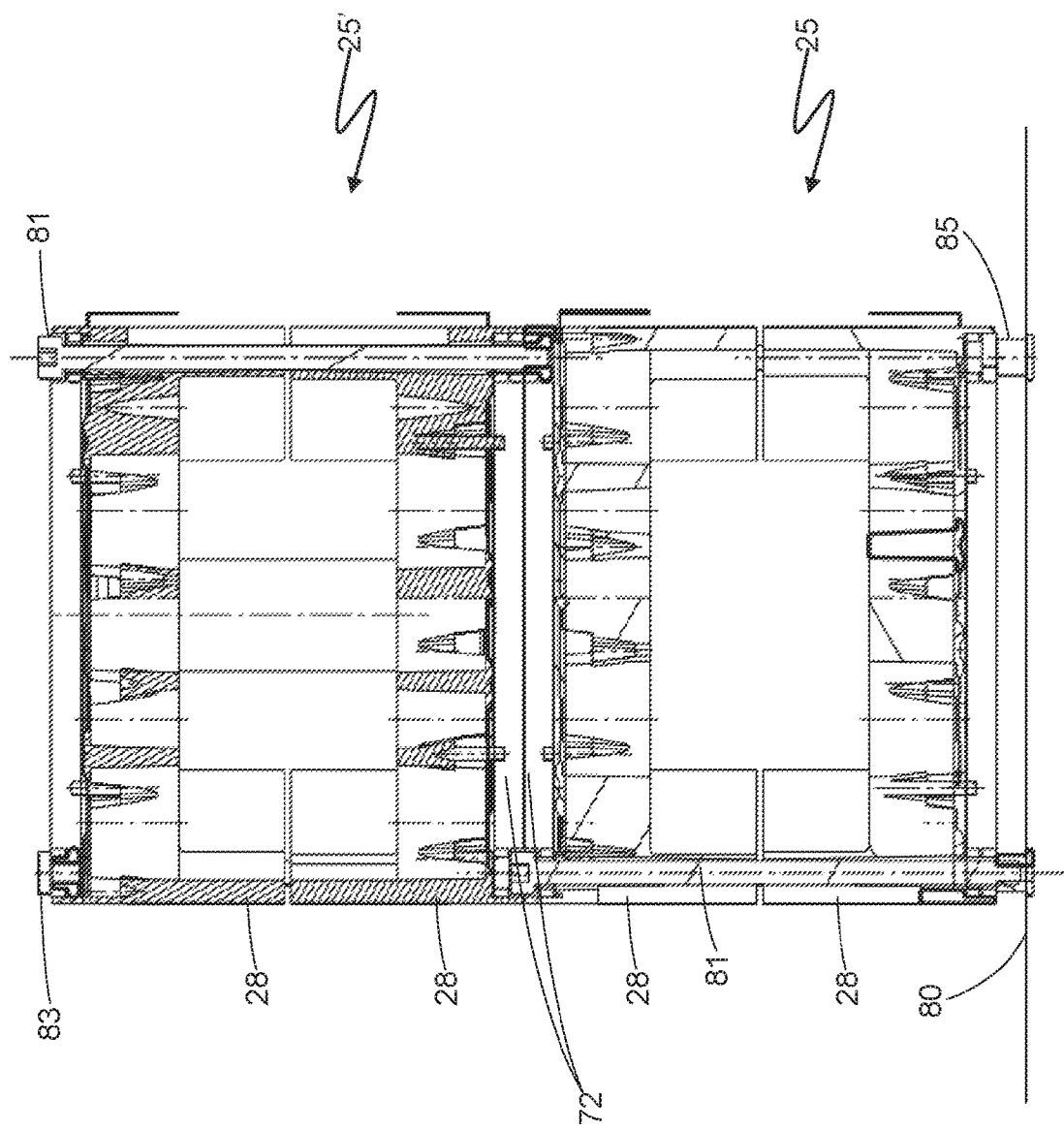
FIG. 18 shows a cross-sectional view of the stack of modules according to FIG. 17.

In this case, as shown in FIGS. 17 and 18, the second module 25' comprises, as before, assembly screws 83 and compression and installation screws 81, where the installation screws, in this case, take hold on the threaded and blind holes 84.

To allow a good mutual adherence between the refrigerated walls 72 of the two stacked modules 25 and 25', it is advantageous that the through holes designed for the screws 81 and 83 externally terminate with a lowered seat formed in the surface of the same refrigerated wall to receive the head of the relative screws.

To connect electrically in series the two modules 25 and 25', further connecting elements can be provided by means of flat plates 91.

These plates overlap half on a first clamp 27 of a module 25 and half on the corresponding clamp 27 of the second module 25. When the two modules 25 and 25' are operatively stacked, the surfaces of the respective clamps 27 are coplanar and contiguous.

As shown in FIGS. 8-18, the clamps 27 can be suitably provided with preliminary threaded holes 90 to connect electric cables (not shown) or to allow the connection of a further battery module, for example, to carry out an upgrade of the vehicle storage system.

It is even possible to connect a third battery module to the second stacked battery module.

Obviously, the number of stackable modules depends on the strength of the refrigerated walls and of the supporting bodies 28.

Unlike the first module, the screws 81 of the second module taking hold on the refrigerated wall 72 of the first battery module 25, far from the floor panel portion 80, discharge on it the related packing stresses.

This implies that the edges of the refrigerated walls 72 must be particularly robust.

FIG. 18 shows a cross section of the stack of FIG. 17. It is clearly shown that the screws 81 of the first module are preferably offset with respect to the screws 81 of the second module 25'.

In the supporting bodies, evacuation openings 76 can be formed to facilitate an evacuation of the hot fluids leaving the safety valve 24 of a chemical battery 19 in case of a thermal drift of the chemical battery 19.

The fluids released by the valve 24 impact on the conductive plate and then can flow back towards an intermediate part between the two supporting bodies 28 to leave the battery module.

Possibly, an evacuation opening 76 is arranged between three chemical batteries. Thanks to the shown configuration in offset rows, it is obtained that an evacuation opening alternates with an arrest element 30 in the middle between three chemical batteries 19.

Advantageously, since the valve 24 is arranged near one of the terminals of the same battery, the evacuation of these fluids implies that they are forced to lap the conductive plate 26 cooled by the respective refrigerated wall 72. Then, such fluids undergo an immediate and effective cooling down.

According to a preferred embodiment, the supporting bodies 28 of each battery module 25 have a mechanical resistance that is lower than the mechanical strength of the individual chemical batteries 19 and is calibrated so as to deform in the event of an impact. In this way, in the event of a violent accident, the battery modules 25 break, thus leaving the chemical batteries 19 free (and electrically mutually disconnected). The batteries can then disperse without being subjected to excessive pressures, which otherwise could cause the explosion of the chemical batteries 19. In other words, the supporting bodies 28 of each battery module 25 are sized to have a sufficiently high mechanical resistance (with an adequate safety margin) to withstand the stresses of the normal guide (deriving from accelerations and from vibrations), but not high enough to withstand the stresses deriving from a collision (obviously of a certain severity, not, e.g. a simple low-speed collision). In any case, it is essential that the mechanical strength of the supporting bodies 28 of each battery module 25 is (considerably) lower than the mechanical resistance of the individual chemical batteries 19, since in the event of a severe impact it is admissible (indeed, it is desirable) that the supporting bodies 28 deform (normally breaking) but leave the individual chemical batteries 19 intact.

The battery module 25 described above has numerous advantages.

First of all, the limited size of the battery module 25 described above makes it possible to "build" the storage system 14 even to obtain "irregular" shapes (i.e. "complex" shapes) to fit the shape of the storage system 14 into the shape of the available space inside the road vehicle so as to occupy the available space as completely as possible.

Moreover, the battery module 25 described above is of simple and inexpensive manufacture, since the supporting bodies 28 can be easily produced by plastic moulding, whereas the conductive plates 26 can be easily produced by shearing or cutting a flat metal plate, e.g. copper or aluminium (and related alloys).

From the description given above, the person skilled in the art is able to manufacture the object of the invention without introducing further construction details. The elements and characteristics shown in the various preferred embodiments, including the drawings, can be mutually combined without however departing from the scope of protection of the present application.

The invention claimed is:

1. A battery module (25) for an electrical storage system (14) for an electric drive vehicle (1); the battery module (25) comprising:
   a set of parallel cylindrical chemical batteries (19) arranged side by side, wherein each battery has at one end a first, positive terminal (22) and at an opposite end a second, negative terminal (21), and wherein said set of batteries identifies two mutually opposite sides defined by corresponding mutually opposite terminals;

at least one supporting body (28) to provide a stable mechanical support to the batteries (19), which comprises a plurality of tubular seats (29) housing inside them at least ends of the chemical batteries (19); and at least two rigid conductive plates (26), each of them arranged on said opposite sides and fastened to the corresponding opposite terminals (21, 22);

at least one rigid refrigerated wall (72) set adherent to one of said at least two rigid conductive plates (26), where the at least one refrigerated wall comprises a planar exterior surface and a hydraulic circuit including hydraulic connectors at an edge thereof oriented towards an interior of the module;

at least one pad (32) having planar top and bottom surfaces sandwiched between said at least one refrigerated wall and said at least one respective conductive plate, wherein said pad is made of an electrically insulating and thermally conductive resilient material having a thermal conductivity greater than 0.2 W/mK, provided to physically contact said at least one plate and said refrigerated wall, thus defining a sandwich.

2. The module according to claim 1, wherein said refrigerated wall (72) comprises a metal body in which one or more passages for a coolant are formed.

3. The module according to claim 1, wherein said refrigerated wall (72) and said at least one conductive plate (26) are relatively rigid with respect to said pad (32) and in which the module is made so that the refrigerated wall (72) compresses the pad so that this latter deforms and maximizes a thermal adhesion with said conductive plate (26) and said refrigerated wall (72).

4. The module according to claim 1, wherein a refrigerated wall (72) and a respective pad (32) are provided for each of said opposite sides in order to cool at least one respective conductive plate.

5. The module according to claim 1, wherein said pad (32) is made of a single resilient material, or else is made up of two or more layers by combining materials substantially having different compliances and different physical properties while maintaining a substantially resilient behaviour.

6. The module according to claim 1, wherein said supporting body is made in a piece and comprises two opposite outer faces that define as many flat seats (31) for said at least two conductive plates (26), and wherein it comprises, on just one of said opposite faces, a plurality of arrest elements (30) holding the chemical batteries (19) within the corresponding tubular seats (29).

7. The module according to claim 1, wherein said supporting body is made up of two separable supporting bodies (28), each comprising corresponding tubular seats that are to be coupled to opposite ends of the set of chemical batteries (19), and wherein each body comprises, on a corresponding outer face, a plurality of arrest elements (30) holding the chemical batteries (19) within the corresponding tubular seats (29).

8. The module according to claim 6, wherein each outer face defines a flat seat (31) for housing at least one corresponding connection plate (26).

9. The module according to claim 4, wherein said refrigerated walls are connected in series with respect to the circulation of said coolant so as to guarantee an even absorption of thermal power, so that an average of the temperature differences between the terminals (20, 21) of one chemical battery and the respective refrigerated walls is substantially constant for all the chemical batteries of the module.

10. The module according to claim 1, wherein in said set of batteries some batteries are turned upside down with respect to the remaining batteries.

11. The module according to claim 1, wherein said conductive plates (26), at terminals (21, 22) of said batteries, comprise H-shaped openings to be welded with the addition of welding material or else are blind to be laser-welded to said terminals.

12. The module according to claim 1, wherein said set of batteries is arranged in two or more rows and wherein two adjacent rows are mutually offset so as to optimise packing thereof.

13. The module according to claim 1, wherein each of said refrigerated walls is provided with hydraulic connectors (73) arranged at opposite edges of the refrigerated wall and emerging from one and the same side.

14. The module according to claim 11, wherein each of said refrigerated walls is provided with hydraulic connectors (73) arranged at opposite edges of the refrigerated wall and emerging from one and the same side, and wherein, when the number of said rows of chemical batteries is an odd number, then a pair of hydraulic connectors (73) is provided on a first same edge of each of said refrigerated walls to be operatively complementary to a foremost chemical battery (19') of a central row of chemical batteries.

15. The module according to claim 14, wherein on a second edge of each of said refrigerated walls, opposite to the first edge, a single hydraulic connector (73) is provided to be operatively complementary to a rearmost chemical battery of said central row of chemical batteries.

16. An ensemble comprising a first battery module (25) according to claim 1, and a portion of a vehicle floor panel (80), wherein said module is arranged so that a first refrigerated wall (72) is set adherent to said portion of vehicle floor panel (80), and wherein a corresponding connection is obtained by means of screws (81) fixed between a second refrigerated wall and said portion of vehicle floor panel, packing tight the battery module up against said portion of vehicle floor panel (80).

17. The ensemble according to claim 16, wherein said pad is compressed relative to the first and second refrigeration walls and the conductive plate.

18. The ensemble according to claim 16, further comprising an additional battery module (25') according to any one of claims 1 to 15, fixed to said second refrigerated wall of said pair of refrigerated walls of said first module (25) just like said first module is fixed to said portion of vehicle floor panel (80).

19. A road vehicle comprising an ensemble formed by a vehicle floor panel and at least a battery module according to claim 16.

\* \* \* \* \*